L. S. KEILHOLTZ.
SIGNALING DEVICE.
APPLICATION FILED JAN. 29, 1917.

1,421,953.

Patented July 4, 1922.

UNITED STATES PATENT OFFICE.

LESTER S. KEILHOLTZ, OF DAYTON, OHIO, ASSIGNOR, BY MESNE ASSIGNMENTS, TO DELCO-LIGHT COMPANY, OF DAYTON, OHIO, A CORPORATION OF DELAWARE.

SIGNALING DEVICE.

1,421,953. Specification of Letters Patent. Patented July 4, 1922.

Application filed January 29, 1917. Serial No. 145,156.

*To all whom it may concern:*

Be it known that I, LESTER S. KEILHOLTZ, a citizen of the United States of America, residing at Dayton, county of Montgomery, and State of Ohio, have invented certain new and useful Improvements in Signaling Devices, of which the following is a full, clear, and exact description.

This invention relates to improvements in combustion engines, and more particularly to that type commonly known as stationary engines.

One of the objects of the present invention is to provide signaling means in connection with the crank case of the engine, whereby the attention of the attendant may be attracted when the lubricant in said crank case has reached a predetermined low level.

Another object of the present invention is to combine an audible signaling device with the crank case of a combustion engine, in such a manner that when the level of the lubricant contained within the crank case reaches a predetermined low point, the operation of the engine piston, in displacing the gas or air normally contained within the crank case chamber of the engine, will be forced through the signaling device and actuate the same to indicate a determined low level of the lubricant.

Further objects and advantages will be apparent from the following description, reference being had to the accompanying drawing, wherein one preferred form of embodiment of the present invention is clearly set forth.

Figures 1, 2:
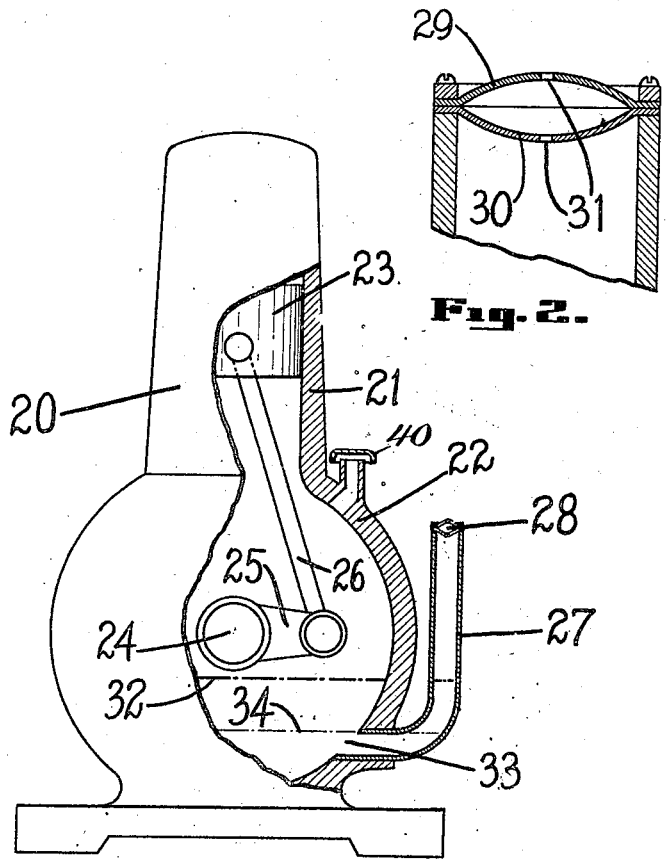
Fig. 1 is a part sectional view of an engine embodying the present invention. The heavy and light dotted lines represent the high or safe, and the low or unsafe level of lubricant, respectively.
Fig. 2 is a detail sectional view of a part of the signaling means.

Referring to the drawing, the numeral 20 designates an internal combustion engine, provided with a cylinder 21 and a crank case 22. The crank shaft 24 has a crank arm 25, which is connected to the piston 23 by means of the connecting rod 26. A pipe or casing 27 is secured to the crank case 22 and communicates with the interior thereof. A signaling device, which may be a whistle 28, as shown in Fig. 1, is carried at the outer extremity of the pipe or casing 27.

By referring to Fig. 2, there is shown a detail view of this whistle 28, comprising two sheet metal discs 29 and 30, secured adjacent to one another, on the casing 27. One of these discs is of a convex form, while the other is concave, which form a small chamber between the two.

A small opening 31 is provided in each of said discs, which openings are directly in alinement with each other, and concentric with the casing 27.

Now, supposing that the engine is operating and that the level of the lubricant in the crank case is up to the heavy dotted line 32, in Fig. 1, the downward travel of the piston 23 will tend to displace the air within the crank case. This displaced air may be permitted to escape out of said crank case, through any suitable breather device such as breather 40.

This displacing of the air within the crank case, and the escape thereof through the breather will tend to cause the lubricant in said crank case to surge. As long as the level of the lubricant is high enough, the opening 33 to the casing 27 will be held closed and none of the displaced air of the crank case can find its way into said casing.

However, as soon as the level of the lubricant has reached about the level designated by the fine line 34, the surging of the lubricant will permit some of the air or gas of the crank case, displaced by the operation of the piston, to force its way into the casing and thence through the holes 31 in the discs 30 and 29. The air passing through said holes 31, under pressure, will cause a noise or whistling sound, thereby signifying that the lubricant in the crank case has reached its low or unsafe level and must be replenished.

It will of course be understood that the pipe 27 may be inserted into the crank case at any level desired, thereby controlling the operation of the signal at a determined low lubricant level.

While the form of mechanism herein shown and described constitutes a preferred embodiment of one form of the invention, it is to be understood that other forms might be adopted and various changes and alterations made in the shape, size, and proportion of the elements therein without departing from the spirit and scope of the invention.

What I claim is as follows:

1. In a device of the character described, the combination with an engine including a crank case having a breather and adapted to contain a supply of lubricant, said crank case being provided with an opening positioned below the normal level of the lubricant; a tube connected to said crank case and having a passage-way communicating with the opening in the crank case; and an audible signaling device secured to said tube, whereby the passage of air to the signaling device due to the operation of the engine will indicate a predetermined low level of the lubricant in the crank case.

2. In a device of the character described, the combination with an engine having a cylinder and a piston therein, and a crank case having a breather and adapted to contain a quantity of lubricant, said crank case being provided with an opening positioned below the normal level of the lubricant; of an audible signal associated with said opening, whereby a displacement of gaseous content from the crank case, due to the operation of the piston, will actuate said signal at such times as the lubricant reaches a predetermined low level.

3. In a device of the character described, the combination with an engine having a cylinder and a piston therein, and a crank case having a breather, adapted to contain a quantity of lubricant; of a signaling device having communication with the crank case below the normal lubricant level and adapted to be actuated, during the pulsation of the gaseous content of the crank case due to the operation of the piston, when the level of the lubricant has reached a predetermined low point.

4. In combination with an engine comprising a crank case having a breather and adapted to contain a quantity of lubricant; of a signaling device communicating with the crank case chamber below the normal level of the lubricant and adapted to be actuated during the pulsation of the gaseous content of said crank case due to the operation of the engine, when the lubricant reaches a predetermined low level.

5. The combination with an engine comprising a crank case having a breather and adapted to contain a quantity of lubricant; of a signaling device comprising a conduit communicating with the crank case chamber below the normal level of the lubricant, and adapted to be actuated during the passage of air through said conduit, due to the operation of the engine, when the lubricant reaches a predetermined low level.

6. In combination with an engine comprising a crank case having a breather and adapted to contain a quantity of lubricant: a signaling device having communication with the crank case below the normal lubricant level, said communication being open for the passage of air for operating said signaling device when the lubricant reaches a predetermined low level.

In testimony whereof I affix my signature in the presence of two subscribing witnesses.

LESTER S. KEILHOLTZ.

Witnesses:
WALTER W. REIDEL,
J. W. McDONALD.